United States Patent
Saigo (10) Patent No.: US 8,251,515 B2
(45) Date of Patent: Aug. 28, 2012

(54) PROJECTOR, PROJECTION SYSTEM, IMAGE DISPLAY METHOD, AND IMAGE DISPLAY PROGRAM

(75) Inventor: Manabu Saigo, Shiojiri (JP)

(73) Assignee: Seiko Epson Corporation, Toyko (JP)

( * ) Notice: Subject to any disclaimer, the term of this patent is extended or adjusted under 35 U.S.C. 154(b) by 261 days.

(21) Appl. No.: 12/696,594

(22) Filed: Jan. 29, 2010

(65) Prior Publication Data

US 2010/0195003 A1    Aug. 5, 2010

(30) Foreign Application Priority Data

Feb. 4, 2009 (JP) ................................. 2009-023430

(51) Int. Cl.
*G03B 21/00* (2006.01)

(52) U.S. Cl. ............... 353/70; 353/30; 353/31; 353/69; 353/84; 353/122; 348/745; 348/625

(58) Field of Classification Search ............. 353/30, 353/31, 69, 70, 71, 84, 122; 345/419, 426, 345/629, 597, 582; 348/383, 36–39, 744, 348/745, 625; 382/266–269
See application file for complete search history.

(56) References Cited

U.S. PATENT DOCUMENTS

| | | | |
|---|---|---|---|
| 6,545,685 B1* | 4/2003 | Dorbie | 345/582 |
| 6,637,887 B2* | 10/2003 | Yamanaka | 353/30 |
| 6,760,075 B2* | 7/2004 | Mayer et al. | 348/383 |
| 7,079,157 B2* | 7/2006 | Deering | 345/613 |
| 7,384,158 B2* | 6/2008 | Ramachandran et al. | 353/70 |
| 2002/0041364 A1* | 4/2002 | Ioka | 353/69 |
| 2003/0098957 A1* | 5/2003 | Haldiman | 353/69 |
| 2008/0259223 A1* | 10/2008 | Read et al. | 348/745 |

FOREIGN PATENT DOCUMENTS

| | | |
|---|---|---|
| JP | A-09-091419 | 4/1997 |
| JP | A-2002-083294 | 3/2002 |

* cited by examiner

*Primary Examiner* — Georgia Y Epps
*Assistant Examiner* — Sultan Chowdury
(74) *Attorney, Agent, or Firm* — Oliff & Berridge, PLC (57) ABSTRACT

A projector includes: a first image projection section adapted to project a first image based on a first image signal, a second image projection section adapted to project a second image based on a second image signal such that pixels of the second image are shifted from pixels of the first image, a correction section adapted to correct the image signal input to the image projection section using a correction filter adapted to correct a difference in optical transfer function between the plurality of image projection sections; and a sharpening section adapted to execute a sharpening process of sharpening an edge portion of the image to be displayed, on the image signal having been corrected by the correction section and to be input to the plurality of image projection sections.

4 Claims, 10 Drawing Sheets

PROJECTOR, PROJECTION SYSTEM, IMAGE DISPLAY METHOD, AND IMAGE DISPLAY PROGRAM

BACKGROUND

1. Technical Field

The present invention relates to a projector, a projection system, an image display method, and an image display program each for sliding pixels of a plurality of image light beams from each other, thereby displaying a high-resolution image.

2. Related Art

In the past, there have been known image processing devices for performing a sharpening process for emphasizing a contour portion of an image in order for preventing blur and so on causing degradation in image quality (see, e.g., JP-A-9-91419 (Document 1) and JP-A-2002-83294 (Document 2)).

The image processing device described in the Document 1 detects an unclear portion in the image data of the input image. Then, the image processing device executes the sharpening process using a so-called Laplacian filter of calculating quadratic differentials of the pixel value of each of the pixels of the detected portion with respect to an x-direction and a y-direction, and adding them to each other.

The image processing device described in the Document 2 executes a so-called unsharpness mask process of calculating a high-frequency component, the difference between the input image and a smoothed image, and then adding the result of multiplication of the high-frequency component by a certain gain to the input image.

Incidentally, there is known a so-called oblique pixel slide method of using a plurality of image projection devices such as a plurality of optical engines or a plurality of projectors, and sliding the pixels of the image light beams emitted from the respective image projection devices a half pixel in an oblique direction, thereby displaying an image with a higher resolution.

However, since the plurality of optical engines mounted on such a projector and the plurality of projectors constituting such a projection system each have an individual difference, and have the sharpness different from each other, there is caused a problem that it is not achievable to display a normal image by the sharpening.

Here, the problem described above will be explained in detail using an example shown in FIGS. 9A, 9B, 10A, and 10B.

Figure 9A:
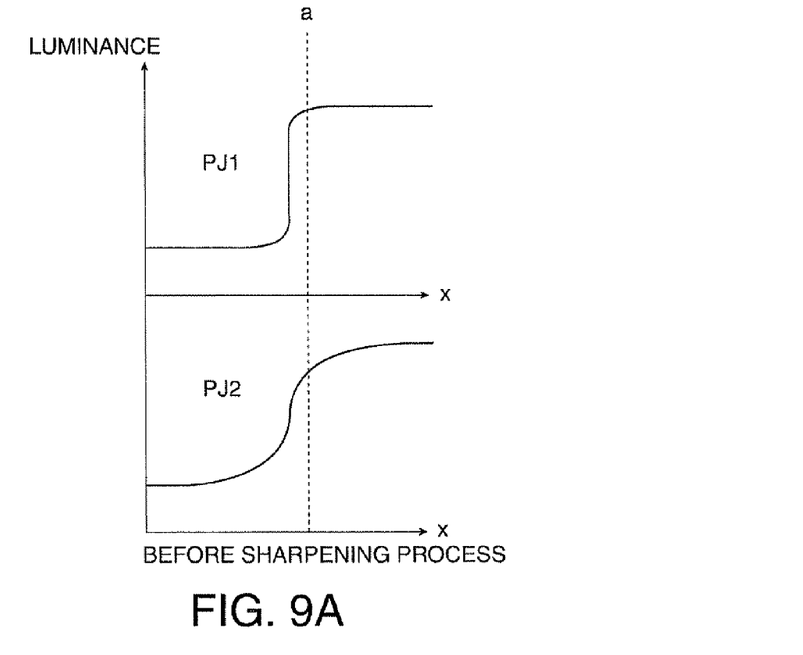
FIGS. 9A and 9B are diagrams showing luminance values at a predetermined pixel position in the case in which the same image signal is input to optical engines (PJ1, PJ2) having optical transfer functions (specifically, modulation transfer functions (MTF)) different from each other.
Figure 9B:
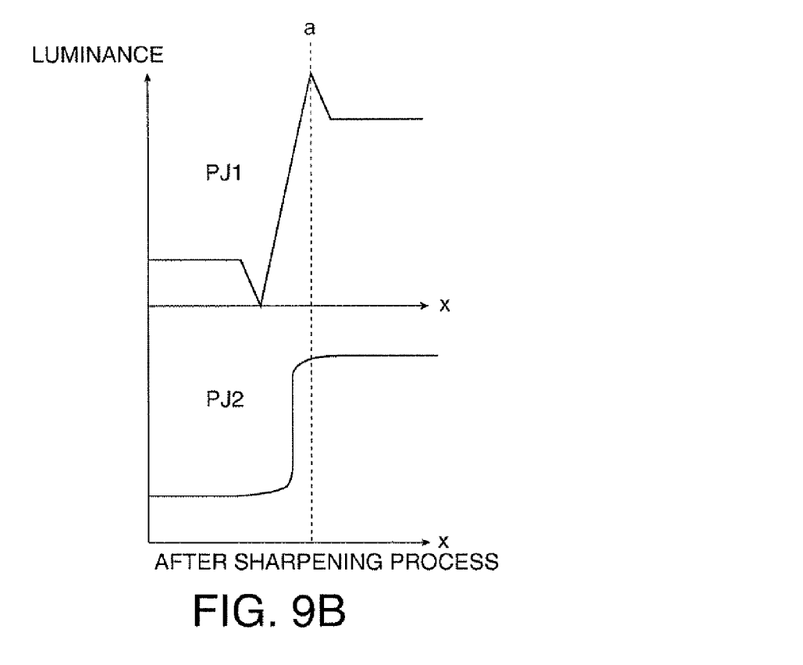
Figure 10A:
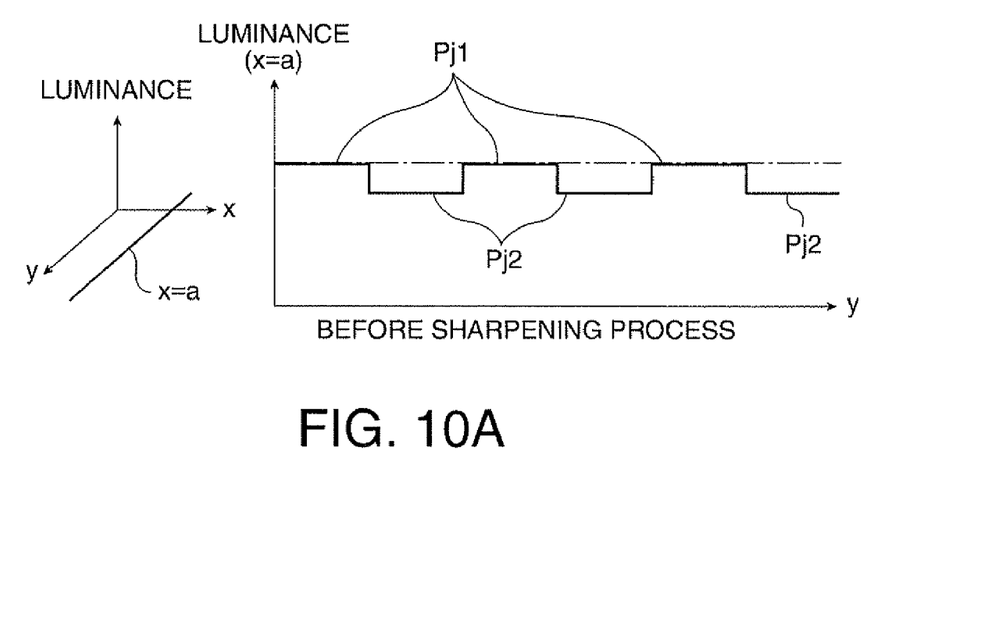
FIGS. 10A and 10B are diagrams showing the luminance values at the predetermined pixel position in the case in which the image light beams from the optical engines PJ1, PJ2 are displayed using the oblique pixel slide method in FIGS. 9A and 9B.
Figure 10B:
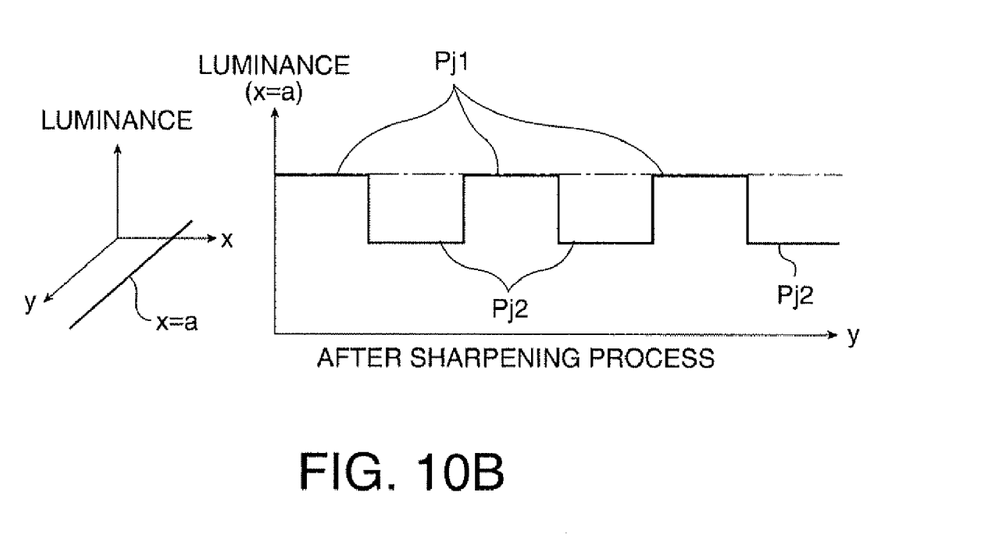

FIGS. 9A and 9B are diagrams showing luminance values at a predetermined pixel position in the case in which the same image signal is input to optical engines (PJ1, PJ2) having optical transfer functions (specifically, modulation transfer functions (MTF)) different from each other. FIGS. 10A and 10B are diagrams showing the luminance values at the predetermined pixel position in the case in which the image light beams from the optical engines PJ1, PJ2 are displayed using the oblique pixel slide method in FIGS. 9A and 9B. Further, "x" shown in FIGS. 9A, 9B, 10A, and 10B denotes the coordinate position in the display image with respect to the horizontal direction, and "y" denotes the coordinate position in the display image in the vertical direction.

As shown in FIG. 9A, when the same image signal is input to the optical engines (PJ1, PJ2) with the MTF different from each other, the luminance values vary along change curves corresponding to the respective MTF in the vicinity of the edge (x=a). When the same sharpening process is executed on such an image signal, the execution of the sharpening process results in the states different from each other as shown in FIG. 9B. Further, in the case in which the image light beams output from these optical engines PJ1, PJ2 are displayed using the oblique pixel slide method, a variation in the luminance value is caused in the vicinity of the edge portion as shown in FIGS. 10A and 10B. Here, the broken lines show the ideal luminance values in the case in which the image light beam having the same sharpness are projected from the optical engines PJ1, PJ2. As shown in FIGS. 10A and 10B, since the sharpness is emphasized in each of the optical engines PJ1, PJ2 when the sharpening process is executed thereon, the luminance difference becomes larger compared to the case in which the sharpening process has not been executed. Therefore, in the oblique pixel slide method, there is a problem that if the sharpening process is executed directly on the image signal input to the optical engines PJ1, PJ2, the luminance difference in the edge portion becomes larger, and a noise such as jaggy becomes noticeable.

SUMMARY

An advantage of some aspects of the invention is to provide a projector, a projection system, an image display method, and an image display program each capable of displaying an image with a noise in the contour portion reduced.

According to an aspect of the invention, there is provided a projector including a first image projection section adapted to project a first image based on a first image signal, a second image projection section adapted to project a second image based on a second image signal such that pixels of the second image are shifted from pixels of the first image, a correction section adapted to correct the image signal input to the image projection section using a correction filter adapted to correct a difference in optical transfer function between the plurality of image projection sections, and a sharpening section adapted to execute a sharpening process of sharpening an edge portion of the image to be displayed, on the image signal having been corrected by the correction section and to be input to the plurality of image projection sections.

According to this aspect of the invention, the image signal is corrected using the correction filter for correcting the difference in optical transfer function between the plurality of image projection sections, and the sharpening process is executed on the image signal thus corrected. Thus, even in the case in which the optical transfer function is different between the plurality of image projection sections constituting the projector, correction into the image signal based on the same optical transfer function becomes possible by executing the image correction using the correction filter, the difference in luminance at the edge portion between the image light beams projected from the respective image projection sections becomes smaller, thus the noise component such as jaggy can be prevented. Further, by executing the sharpening process on such an image signal, it is possible to eliminate the blur, thereby displaying the image with an emphasized edge, and at the same time, a high-resolution image can be displayed using the oblique pixel slide method. According to the configuration described above, it becomes possible to display a clearer image, in which the blur of the edge portion or the noise such as jaggy is suppressed, with high resolution, thus a high-quality image with improved visibility can be displayed.

According to another aspect of the invention, in the projector of the above aspect of the invention, it is preferable that an edge detection section adapted to detect an edge area having the edge portion in the image signal is further provided, and the correction section executes a correction on the edge area detected by the edge detection section, using the first correction filter.

According to this aspect of the invention, the edge detection section detects the edge area, separation into the edge area and the other area is performed, and the correction process using the correction filter is executed only on the edge area. Therefore, the time required for the correction operation can be reduced compared to the case of executing the correction process using the correction filter on the entire image signal, and the speeding up of the processing and reduction of the processing load can be achieved, thus the quick image display can be realized.

According to still another aspect of the invention, in the projector of the above aspect of the invention, it is preferable that the correction section takes the optical transfer function of either one of the plurality of image projection sections as a reference optical transfer function, and corrects the image signal input to the rest of the plurality of image projection sections using a second correction filter adapted to correct a difference in optical transfer function of the rest of the plurality of image projection sections with respect to the reference optical transfer function instead of the first correction filter.

According to this aspect of the invention, the correction section takes the optical transfer function of either one of the plurality of image projection sections as the reference optical transfer function, and corrects the image signal using the correction filter for correcting the optical transfer function of the rest of the image projection sections into the reference optical transfer function. Therefore, the correction process by the correction section on the image signal input to the image projection section having the reference optical transfer function becomes unnecessary. Therefore, the speeding up of the correction process executed by the correction section can be achieved, and the processing load can also be reduced.

According to yet another aspect of the invention, there is provided a projection system including a first projector adapted to project a first image based on a first image signal, a second projector adapted to project a second image based on a second image signal such that pixels of the second image are shifted from pixels of the first image, a correction section adapted to correct the image signal input to the projector using a correction filter adapted to correct a difference in optical transfer function between the plurality of projectors, and a sharpening section adapted to execute a sharpening process of sharpening an edge portion of the image to be displayed, on the image signal having been corrected by the correction section and to be input to the plurality of image projection sections.

According to this aspect of the invention, a plurality of projectors is substituted for the plurality of image projection sections in the above aspects of the invention, and the function and the advantage substantially the same as in the above aspects of the invention can be obtained. In other words, by correcting the image signals input to the respective projectors using the correction filter, the noise such as jaggy can be suppressed, and at the same time, by executing the sharpening process, the edge can be emphasized. Further, by displaying the image by a plurality of projectors using the oblique pixel slide method, a high-resolution image can be displayed. Therefore, according to the projection system described above, a high-quality image with improved visibility can be displayed.

According to still yet another aspect of the invention, there is provided an image display method including the steps of (a) providing a first projector adapted to project a first image based on a first image signal and a second projector adapted to project a second image based on a second image signal such that pixels of the second image are shifted from pixels of the first image, (b) correcting the image signal input to the image projection section using a correction filter adapted to correct a difference in optical transfer function between the plurality of image projection sections, and (c) executing, after step (b), a sharpening process of sharpening an edge portion of the image to be displayed, on the image signal to be input to the plurality of image projection sections.

According to this aspect of the invention, similarly to the aspect of the invention related to the projector, in the step (b), the image signal is corrected using the correction filter for correcting the difference in optical transfer function between the plurality of image projection sections, and the sharpening process is executed on the image signal thus corrected. Therefore, similarly to the aspects of the invention described above, even in the case in which the optical transfer function is different between the plurality of image projection sections, the correction into the image signal based on the same optical transfer function becomes possible due to the step (b). Further, by executing the sharpening process on such an image signal, it is possible to eliminate the blur, thereby displaying the image with an emphasized edge, and at the same time, a high-resolution image can be displayed using the oblique pixel slide method. In other words, it becomes possible to display a clearer image, in which blur in the edge portion or noise such as jaggy is suppressed, with high resolution, thus a high-quality image with improved visibility can be displayed.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, the projector according to a first embodiment of the invention will be explained with reference to the accompanying drawings.

Figure 1:
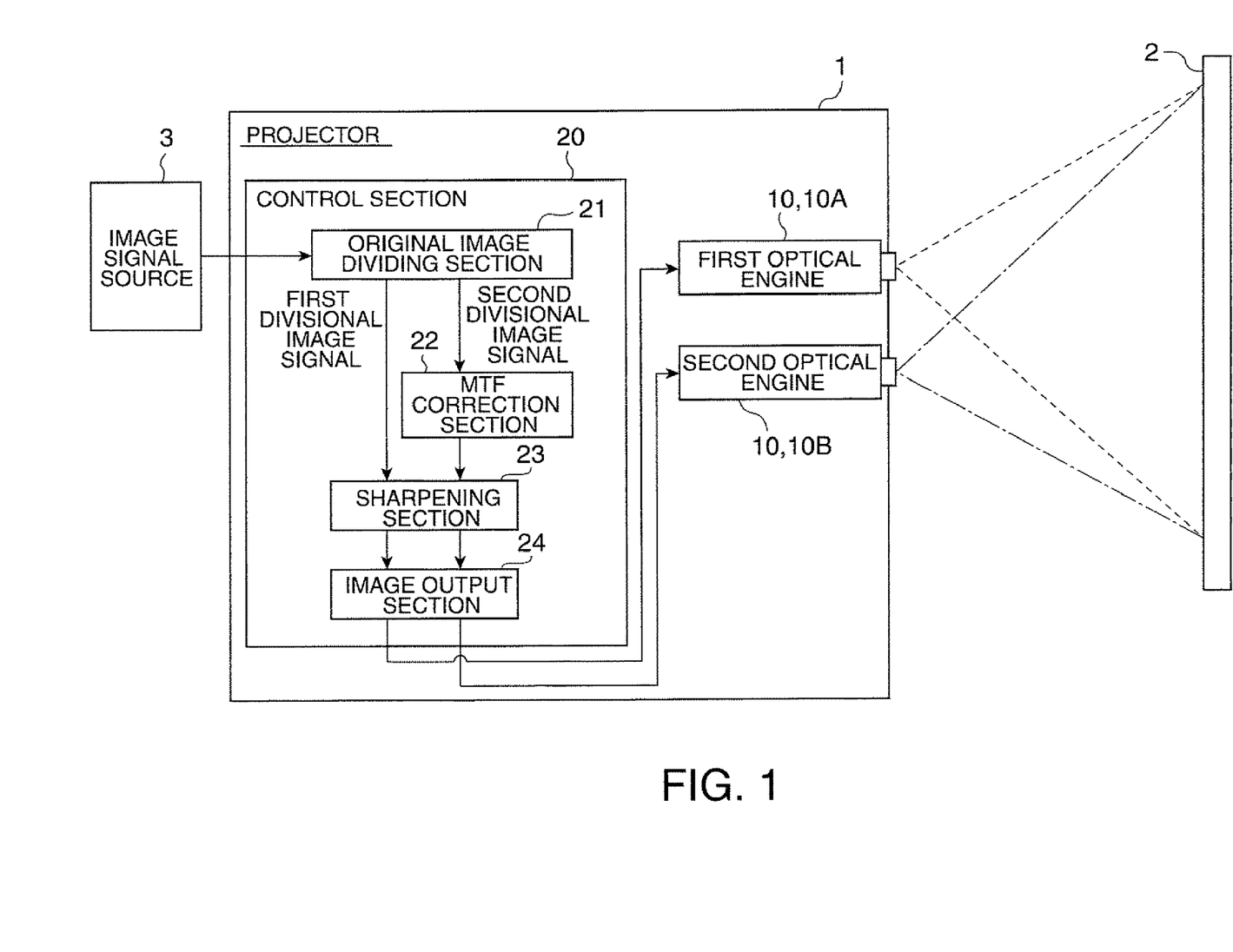
FIG. 1 is a block diagram showing a schematic configuration of a projector according to a first embodiment of the invention.
Figure 2:
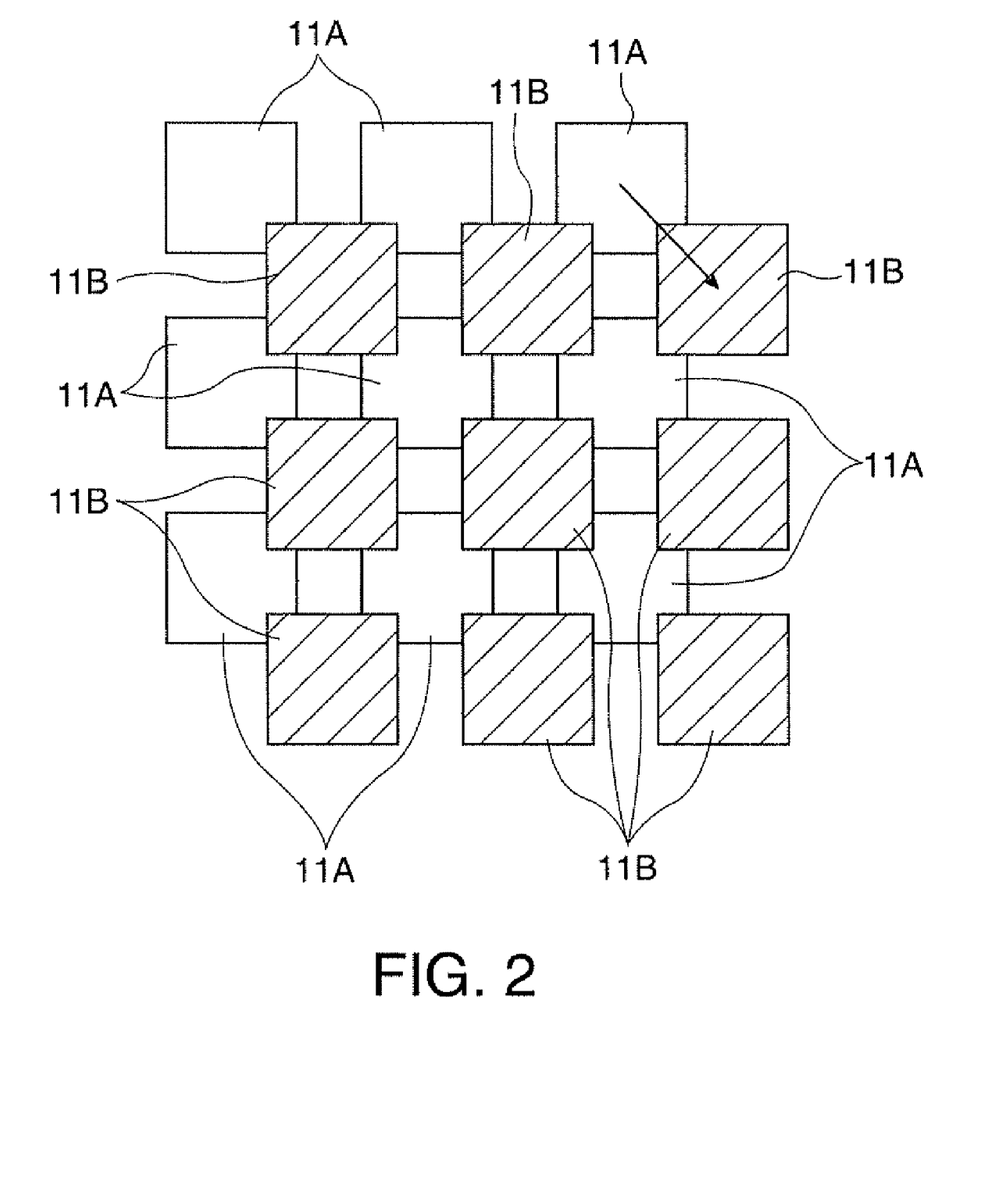
FIG. 2 is a diagram showing some pixels of an image displayed on a screen.

FIG. 1 is a block diagram showing a schematic configuration of the projector according to the first embodiment of the invention. FIG. 2 is a diagram showing some pixels of an image displayed on a screen.

In FIG. 1, the projector 1 is a device, which is provided with optical engines 10 (a first optical engine 10A, a second optical engine 10B) as a pair of image projection sections, and a control section 20 for inputting an image signal to each of the optical engines 10, and projects image light beams on a screen 2 from the pair of optical engines 10, thereby displaying the image on the screen 2.

Although not shown in the drawings, the pair of optical engines 10 are each provided with an illumination optical system for emitting a light beam, a separation optical system for separating the light beam emitted from the illumination optical system into colored light beams of, for example, RGB, a light modulation optical system having liquid crystal panels for modulating the respective colored light beams thus obtained by the separation, based on the image signal, a light combining optical system for combining the colored light beams to generate the image light beam, a projection optical system for projecting the image light beam thus generated, and a drive circuit for controlling the liquid crystal panels in accordance with the image signal. Further, the drive circuit of each of the optical engines 10 controls the liquid crystal panels based on the image signal input from the control section 20 to generate the image light beam corresponding to the image signal, and project it to the screen 2.

Here, the optical engines 10 in the projector 1 project the respective image light beams so that the display is performed with the pixel positions in the projected image slid a half pixel in both of the horizontal and vertical directions. Thus, as shown in FIG. 2, a pixel 11B of a second divisional image displayed by the second optical engine 10B is disposed between four pixels 11A (2 vertical pixels×2 horizontal pixels) of a first divisional image displayed by the first optical engine 10A. Therefore, in such a projector 1 as described above, it becomes possible to display pixels twice as many as those of the normal case on the screen 2, thereby displaying a high-resolution image.

The control section 20 controls the overall operations of the projector 1. Further, the control section 20 generates the image signals to be output to the respective optical engines 10 (10A, 10B) based on the original image signal input from an image signal source 3, then executes a correction process on the image signals thus generated, and outputs the image signals to the respective optical engines 10. Here, as the image signal source 3, any device can be adopted providing the device is electric equipment capable of outputting the image signal, such as a personal computer, a television set, or video equipment.

The control section 20 is composed of integrated circuits such as a memory, a central processing unit (CPU), and various types of IC chips. The memory stores various programs and various data for controlling the projector 1. Further, as the various programs stored in the memory, and along which the CPU performs arithmetic processing, there are included an original image dividing section 21, an MTF correction section 22 (constituting the correction section of the invention), a sharpening section 23, an image output section 24, and so on, as shown in FIG. 1.

The original image dividing section 21 generates two divisional image signals, which are image signals displayed respectively by the optical engines 10A and 10B, and obtained by dividing the original image signal input from the image signal source 3. In this case, the original image dividing section 21 divides the image signal of, for example, a serial transmission format into an image signal with odd-numbered pixel data and an image signal with even-numbered pixel data, and generates the respective divisional image signals as a first divisional image signal for outputting the image signal composed of the odd-numbered pixel data to the first optical engine 10A and a second divisional image signal for outputting the image signal composed of the even-numbered pixel data to the second optical engine 10B.

The MTF correction section 22 executes the process of correcting the image signal input to at least either one of the first optical engine 10A and the second optical engine 10B using a correction filter for correcting the difference of the optical transfer function of that optical engine with respect to a desired optical transfer function. In the first embodiment, the MTF correction section 22 executes the process of the correction using an MTF correction filter on the second divisional image signal to be output to the second optical engine 10B.

Figure 3:
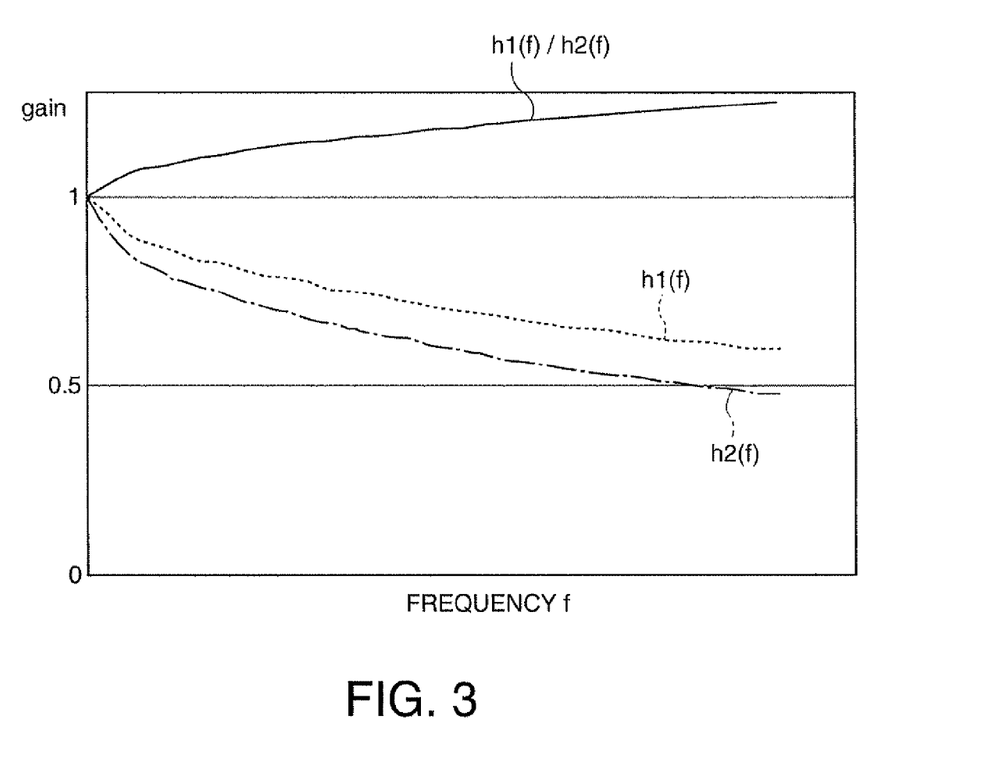
FIG. 3 is a diagram showing the MTF of a first optical engine, the MTF of a second optical engine, and an MTF correction filter for correcting the difference between the MTF of the first optical engine and the MTF of the second optical engine.

Since there is an individual difference between the first optical engine 10A and the second optical engine 10B, the first optical engine 10A and the second optical engine 10B have the MTF different from each other. Here, as FIG. 3, there is shown a drawing showing the MTF ($h1(f)$) of the first optical engine 10A, the MTF ($h2(f)$) of the second optical engine 10B, and the MTF correction filter ($h1(f)/h2(f)$) for correcting the difference of the MTF of the second optical engine 10B with respect to the MTF of the first optical engine 10A. The MTF correction section 22 multiplies the second divisional image signal by such an MTF correction filter as shown in FIG. 3. Specifically, the MTF correction section 22 uses the MTF of the first optical engine 10A as a reference optical transfer function, and corrects the second divisional image signal to be input to the second optical engine 10B using the MTF correction filter for correcting the difference between the optical transfer function of the second optical engine 10B and the reference optical transfer function.

Thus, in the first divisional image displayed by the first optical engine 10A based on the first divisional image signal and the second divisional image displayed by the second optical engine 10B based on the second divisional image signal, the variations of the pixel values (luminance values) at the positions corresponding to each other become substantially the same. For example, even in the case in which the luminance variation of the image displayed by the first optical engine 10A and the luminance variation of the image displayed by the second optical engine 10B are different from each other at a predetermined pixel position before the correction process by the MTF correction section 22, it is possible to correct a luminance variation curve of the optical engine PJ2 representing the luminance variation of the second divisional image into a luminance variation curve of the optical engine PJ1 representing the luminance variation of the first divisional image by the correction process of the MTF correction section 22.

It should be noted that the MTF correction filter has previously been calculated based on the MTF of the first optical engine 10A and the MTF of the second optical engine 10B measured at the time of manufacturing the projector 1, and then stored in the memory. Further, the MTF correction section 22 retrieves the MTF correction filter, which is stored in the memory, according to needs, and executes the correction of the second divisional image signal.

The sharpening section 23 executes the sharpening process, namely the process of emphasizing the contour of the edge portion, on the first divisional image and the second divisional image. In the present embodiment, the sharpening section 23 executes the correction of emphasizing the high-frequency component using the Laplacian filter.

Figure 4:
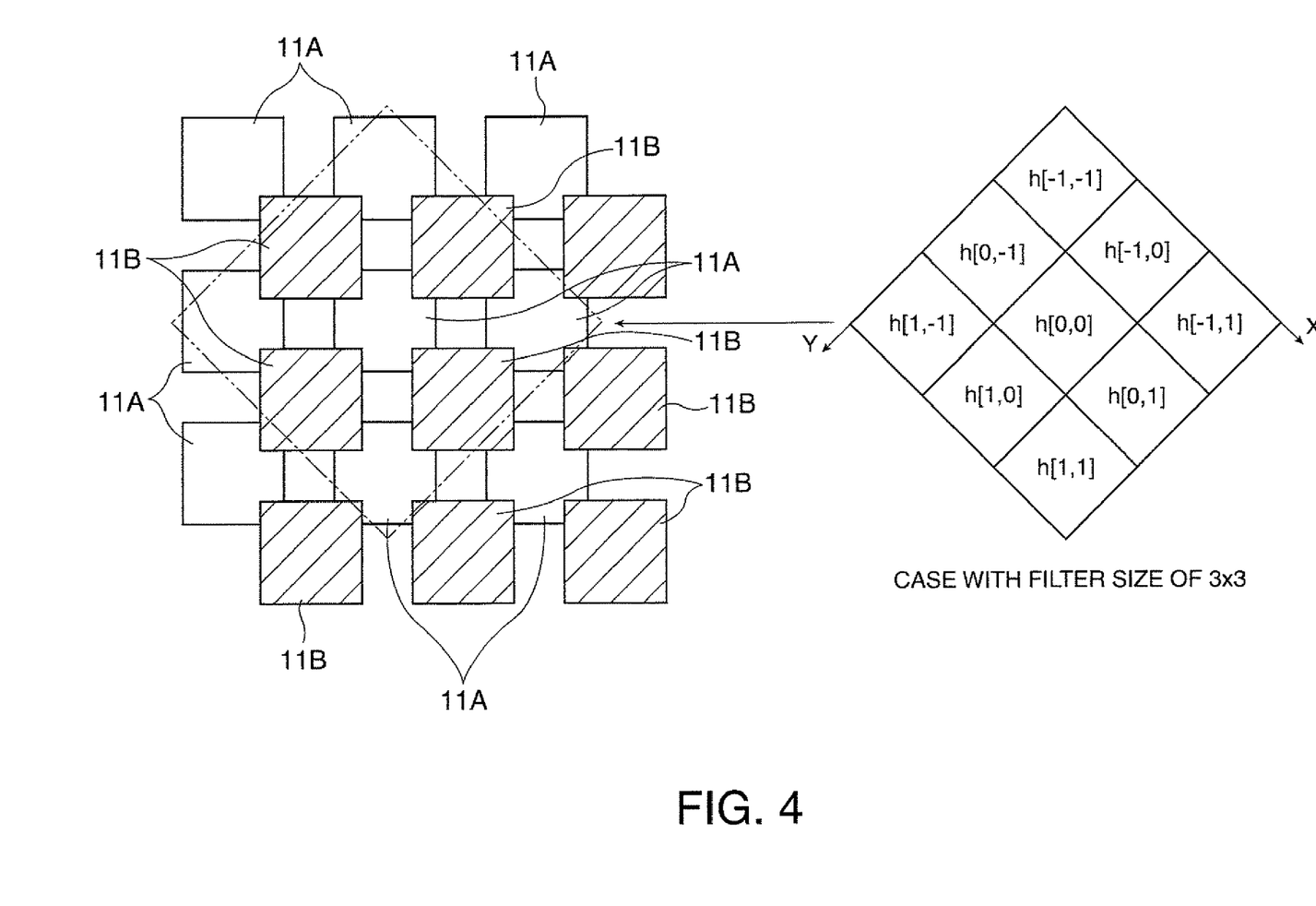
FIG. 4 is a diagram showing an example of a part of the image displayed on the screen and a range of a Laplacian filter.

Specifically, in the case in which the image shown in FIG. 4 is displayed on the screen 2, the sharpening section 23 applies the Laplacian filter of a 3×3 size shown, for example, in FIG. 4 to the pixels 11A output from the optical engine 10A and the pixels 11B output from the optical engine 10B, thereby emphasizing the high-frequency component. Here, assuming the pixel value of the pixel corresponding to the ith pixel in the X-direction and the jth pixel in the Y-direction as f(i,j), the Laplacian is represented as the sum of the quadratic differential in the X-direction and the quadratic differential in the Y-direction as expressed by the formula 1 below.

$$\nabla^2 f(i, j) = \frac{\delta^2 f}{\delta x^2} + \frac{\delta^2 f}{\delta y^2} \quad (1)$$

Here, the quadratic differentials in the X-direction and the Y-direction are defined as the formulas 2, 3 below, respectively.

$$\frac{\delta^2 f}{\delta x^2} = f[i+1, j] + f[i-1, j] - 2f[i, j] \quad (2)$$

$$\frac{\delta^2 f}{\delta y^2} = f[i, j+1] + f[i, j-1] - 2f[i, j] \quad (3)$$

The Laplacian filter expressed by the formula 4 below can be obtained by substituting the formulas 2, 3 into the formula 1.

$$\nabla f(i,j) = f[i+1,j] + f[i-1,j] + f[i, j+1] + f[i, j-1] - 4f[i,j] \quad (4)$$

Since such a Laplacian filter $\nabla^2 f(i,j)$ is the quadratic differential, a large value is output at a portion where the variation of the pixel value is large, namely at a portion where an edge is formed in the image.

The sharpening section 23 executes the process of sharpening the respective divisional image signals along the formula 5 below using the Laplacian filter $\nabla^2 f(i,j)$.

$$F(i,j) = f(i,j) - (\nabla^2 f(i,j) \times C) \quad (5)$$

In the above description, f(i,j) denotes the input image signal, and F(i,j) denotes the image signal of the image thus sharpened. Further, the constant C is a parameter representing how the edge portion is emphasized in the sharpening process using the Laplacian filter.

Here, since the divisional image signals (f(i,j)) input respectively to the optical engine 10A and the optical engine 10B become to have substantially the same pixel value (luminance value) variation based on the MTF due to the correction by the MTF correction section 22, substantially the same sharpening process is executed on the divisional image signals also in the sharpening process performed by the sharpening section 23. Therefore, in the image shown in FIG. 4, no difference in pixel value is caused by the sharpening process between the edge pixel 11A and the edge pixel 11B adjacent to each other, and the problem such as jaggy does not arise.

The image output section 24 outputs the divisional image signals thus sharpened respectively to the corresponding optical engines 10A, 10B. The optical engines 10A, 10B project the image shown in FIG. 2 on the screen 2 based on the respective divisional image signals, thereby displaying the high-resolution image by the oblique pixel slide method.

Operation of Projector

Then, an image output method of the projector 1 described above will be explained with reference to the drawings.

Figure 5:
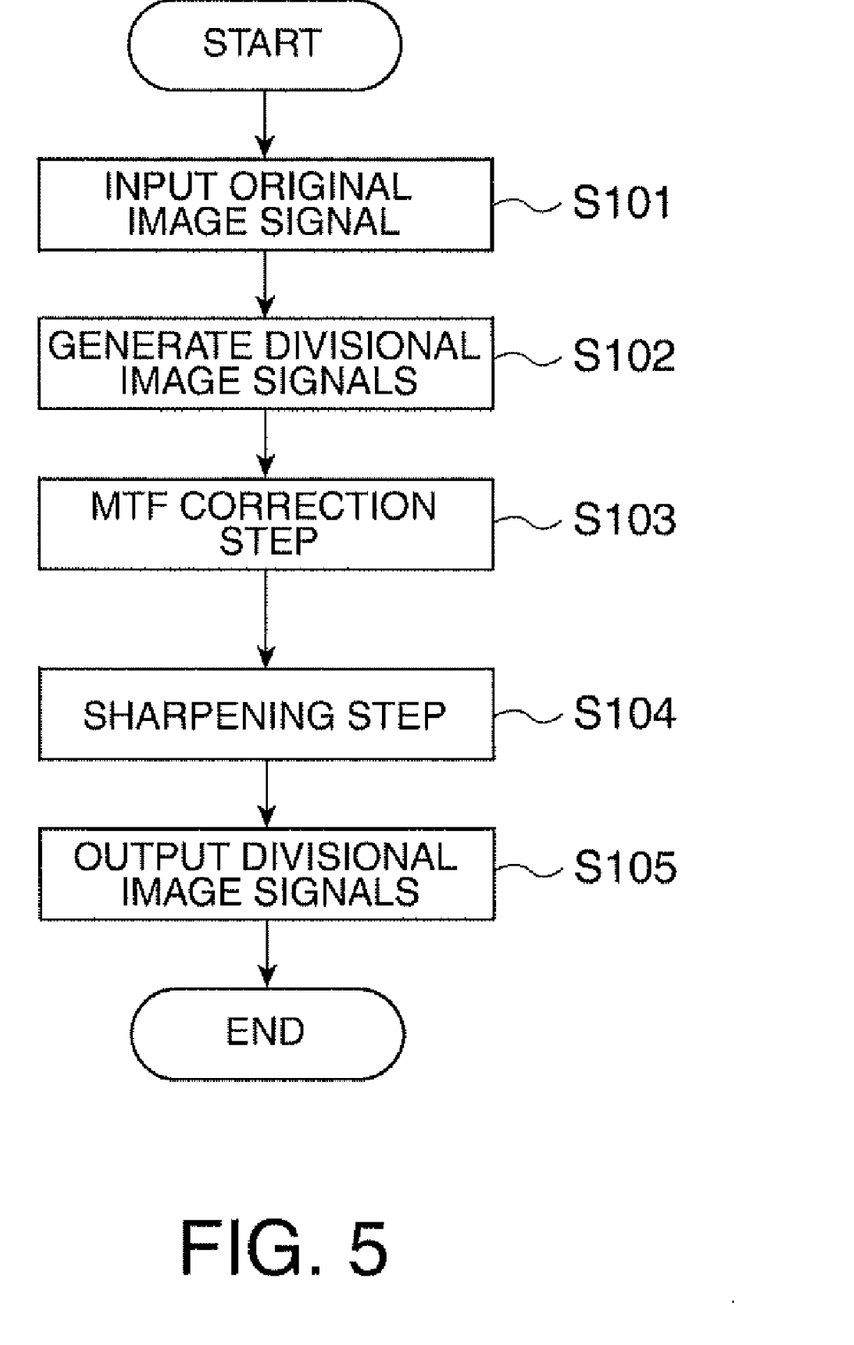
FIG. 5 is a flowchart showing an image output process of the projector according to the first embodiment.

FIG. 5 is a flowchart showing an image output process of the projector 1 according to the first embodiment.

In the projector 1, when the original image signal is input from the image signal source 3 to the control section 20 (step S101), the original image dividing section 21 of the control section 20 generates the first divisional image signal to be displayed by the first optical engine 10A and the second divisional image signal to be displayed by the second optical engine 10B (step S102) based on the input original image signal.

In this case, the original image dividing section 21 sorts the pixel signals of the original image signal input thereto, for example, into the odd-numbered pixel signals and the even-numbered pixel signals, and thus, generates the first divisional image signal and the second divisional image signal having the pixels slid a half pixel from each other in both of the horizontal direction and the vertical direction, as shown in FIG. 2.

Subsequently, the control section 20 makes the MTF correction section 22 execute (step S103, a correction step) the MTF correction process on the second divisional image signal out of the divisional image signals generated in the step S102. In this case, the MTF correction section 22 retrieves the MTF correction filter previously stored in the memory, and then corrects the second divisional image signal using the MTF correction filter.

Subsequently, the control section 20 makes the sharpening section 23 execute (step S104, a sharpening step) the sharpening process on the first divisional image signal generated in the step S102 and the second divisional image signal on which the MTF correction process is executed in the step S103. Specifically, the sharpening section 23 executes the sharpening process expressed as the formula 5 using the Laplacian filter expressed as the formula 4, thereby executing the process of emphasizing the high-frequency component at the edge portion of the image.

Further, the image output section 24 of the control section 20 outputs the first and second divisional image signals, which are sharpened in the step S104, respectively to the first and second optical engines 10A, 10B, thereby making them emit the image light beams, which correspond to the oblique pixel slide method shown in FIG. 2, on the screen 2 (step S105).

Function and Advantage of Projector

As described above, the projector 1 according to the first embodiment divides the original image signal input thereto into the first and second divisional image signals corresponding to the oblique pixel slide method using the original image dividing section 21. Then, the MTF correction section 22 applies the MTF correction filter for correcting the difference of the MTF of the second optical engine 10B with respect to the MTF of the first optical engine 10A on the second divisional image signal out of the divisional image signals thus obtained by dividing the original image signal, thus executing the correction process. Subsequently, the sharpening section 23 executes the sharpening process on the first and second divisional image signals, thus performing the process of emphasizing the edge portion.

Therefore, even in the case in which the first optical engine 10A and the second optical engine 10B have the MTF different from each other, by correcting the second divisional image signal to be input to the second optical engine 10B with the MTF filter as described above, it is possible to make the image light beam output from the second optical engine 10B fit into the MTF of the first optical engine 10A. In other words, even in the case in which the luminance variation is different between the edge portion of the image light beam output from the first optical engine 10A and the edge portion of the image light beam output from the second optical engine 10B as shown in, for example, FIG. 9A, in the condition in which the MTF correction is not executed, it is possible to make the luminance variation of the second divisional image signal fit into the luminance variation of the first divisional image signal by executing the MTF correction process of the step S103.

Therefore, even in the case in which the sharpening process is executed on the first divisional image signal and the second divisional image signal on which the MTF correction process has been executed, it becomes possible to prevent the difference in luminance between the first divisional image signal and the second divisional image signal from increasing, and thus, the luminance variation represented by the dashed line shown in FIGS. 10A and 10B can be realized. Therefore, in the case in which the image is displayed with the pixels slid a half pixel from each other in both of the horizontal and vertical directions in the oblique pixel slide method, it becomes possible to reduce the noise in the edge portion (the contour portion) to form a smooth contour, thereby displaying a high-quality and high-resolution image.

Further, it is also possible for the MTF correction section 22 to execute the process for performing correction of fitting the signal into a predetermined MTF on both of the first and second divisional image signals. In this case, since the two image signals are fitted into the predetermined MTF, it becomes possible to adjust the MTF of the optical engines 10A and 10B to an arbitrary MTF while matching the MTF thereof with each other. Further, as in the case of the projector 1 according to the present embodiment, it is also possible to execute the correction process only on the second divisional image signal. In this case, there is no need for executing the MTF correction process on the first divisional image signal, and it is sufficient to execute the MTF correction process only on the second divisional image signal. Therefore, the processing load can be reduced, and at the same time, speeding up of the process can be achieved.

Second Embodiment

Then, the projector according to a second embodiment of the invention will be explained with reference to the accompanying drawings. It should be noted that in the explanations on and after the second embodiment, the constituents identical to those of the first embodiment described above will be provided with the same reference symbols in the drawings, and the explanations therefor will be simplified or omitted.
Configuration of Projector FIG. 6 is a block diagram showing a schematic configuration of the projector according to the second embodiment of the invention.

Figure 6:
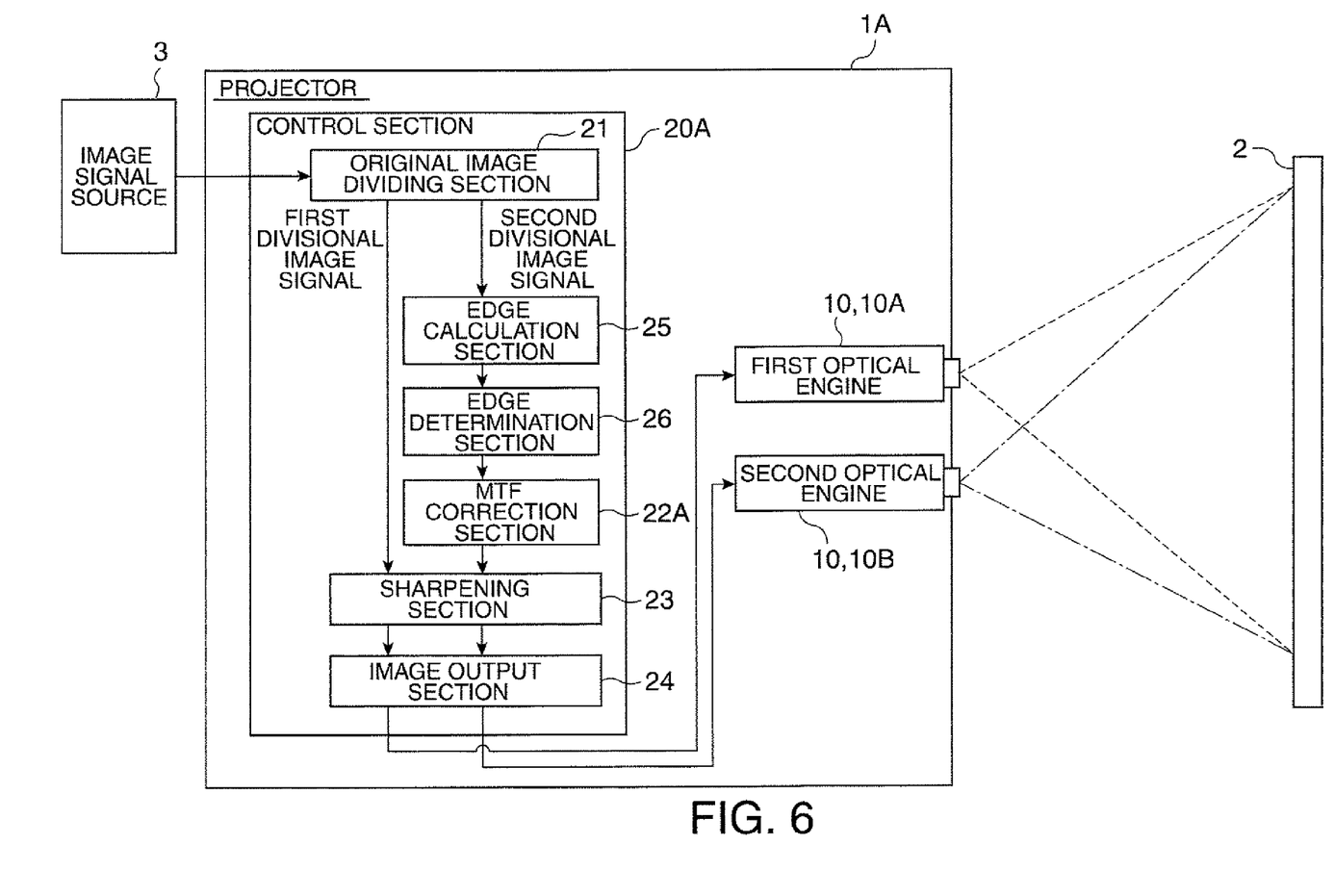
FIG. 6 is a block diagram showing a schematic configuration of a projector according to a second embodiment of the invention.

In FIG. 6, the projector 1A is provided with a control section 20A and the pair of optical engines 10 (10A, 10B). Similarly to the projector 1 according to the first embodiment, the projector 1A is also a projector for dividing the original image signal, which is input from the image signal source 3, into the first and second divisional image signals corresponding to the oblique pixel slide method, and outputting them respectively to the first and second optical engines 10A, 10B, thereby displaying a high-resolution image on the screen 2.

Further, the control section 20A of the projector 1A according to the second embodiment is provided with the original image dividing section 21, an edge calculation section 25, an edge determination section 26, the MTF correction section 22A, the sharpening section 23, and the image output section 24. Here, the edge calculation section 25 and the edge determination section 26 constitute an edge detection section of the invention. It should be noted that since the original image dividing section 21, the sharpening section 23, and the image output section 24 are the constituents substantially the same as those in the first embodiment, the explanations therefor will be omitted here.

The edge calculation section 25 executes a filter process for detecting the edge portion of the image on the second divisional image signal out of the divisional image signals obtained by the dividing process executed by the original image dividing section 21. Specifically, the edge calculation section 25 applies a high-pass filter such as the Laplacian filter expressed by the formula 4 described above on the respective pixel data constituting the second divisional image signal, and obtains the output value thereof as an edge amount.

The edge determination section 26 determines whether or not the edge amount with respect to each of the pixels calculated by the edge calculation section 25 is equal to or greater than a predetermined threshold value. Further, the edge determination section 26 determines the pixel with the edge amount equal to or greater than the predetermined threshold value as an edge pixel.

Although the MTF correction section 22A is substantially the same as the MTF correction section 22 of the first embodiment, the MTF correction section 22A of the second embodiment performs the process of multiplying the only the pixels determined as the edge pixels by the edge determination section 26 by the MTF correction filter.
Operation of Projector According to Second Embodiment Then, an image output method executed by the projector 1A described above will be explained with reference to the drawings.

Figure 7:
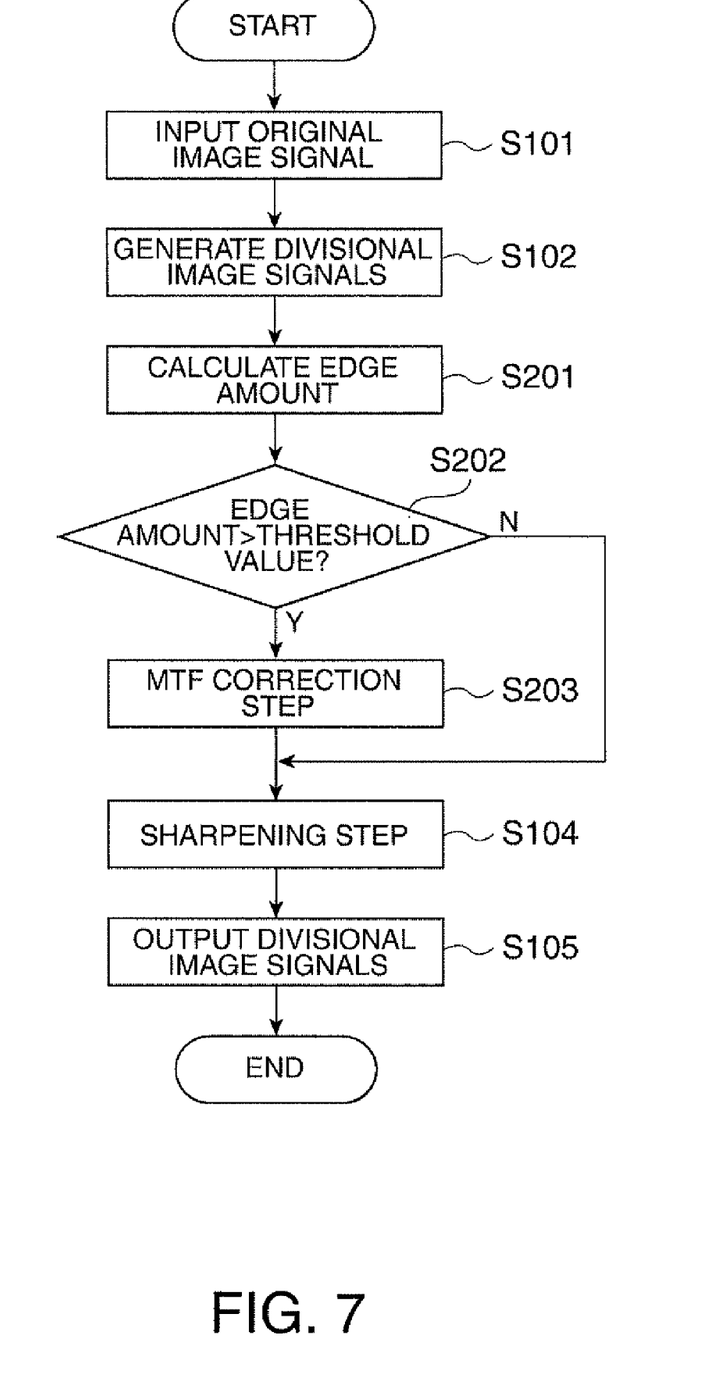
FIG. 7 is a flowchart showing an image output process of the projector according to the second embodiment.

FIG. 7 is a flowchart showing an image output process of the projector 1A according to the second embodiment.

Similarly to the first embodiment, when the original image signal is input from the image signal source 3 to the control section 20A in the step S101, the projector 1A executes the process in the step S102 to generate the first and second divisional image signals.

Subsequently, the edge calculation section 25 of the projector 1A executes (step S201) the edge calculation process of calculating the edge amount of each of the edge data in the second divisional image signal generated in the step S102.

As described above, in the step S201, the edge calculation section 25 applies the Laplacian filter on each of the pixel data, and calculates the output value as the edge amount.

After the step S201, the edge determination section 26 of the control section 20A determines (step S202) whether or not the edge amount calculated in the step S201 is equal to or greater than the predetermined threshold value. If it is determined in the step S202 that the edge amount is smaller than the threshold value, the sharpening process of the step S104 is executed on that pixel without executing the MTF correction process.

On the other hand, if it is determined in the step S202 that the pixel is the edge pixel with the edge amount equal to or greater than the threshold value, the MTF correction section 22 executes (step S203) the MTF correction process on the pixel data of this edge pixel using the MTF correction filter retrieved from the memory.

Subsequently, the sharpening process of the step S104 is executed on both of the first and second divisional image signals, and the divisional image signals corresponding respectively to the optical engines 10 are output by the image output process of the step S105, thereby displaying the image on the screen 2.

Function and Advantage of Projector According to Second Embodiment

As described above, in the projector 1A according to the second embodiment, the edge amount of each of the pixels in the second divisional image signal is calculated by the edge calculation section 25, and the edge pixels are detected based on the determination on whether or not the edge amount thereof is equal to or greater than the predetermined threshold value. Further, the MTF correction section 22A executes the image correction only on the edge pixels thus detected using the MTF correction filter.

In other words, the MTF correction process is executed on the edge pixels of the second divisional image signal forming the edge portion (the contour portion) significantly influenced by the noise such as jaggy in the oblique pixel slide method. Therefore, similarly to the first embodiment, it is possible to fit the edge pixels in the second divisional image signal into the luminance variation of the edge pixels output from the first optical engine 10A, thereby effectively eliminating the noise such as jaggy.

On the other hand, since the pixels other than the edge pixels are only slightly influenced by the sharpening process executed by the sharpening section 23, and the difference in luminance variation of the image due to the difference in the MTF between the optical engines 10, there is no particular need for executing the MTF correction process. The projector 1A according to the second embodiment executes only the sharpening process by the sharpening section 23 on such pixels other than the edge pixels without executing the MTF correction process by the MTF correction section 22A. Therefore, since the MTF correction process is executed only on the edge pixels, the reduction of the processing load can be achieved compared to the case in which the MTF correction process is executed on all of the pixels, and thus, the speeding up of the processing can also be achieved.

Further, the edge calculation section 25 calculates the edge amount using the Laplacian filter used also in the MTF correction section 22A. Therefore, there is no need for storing a separate high-pass filter dedicated to calculating the edge amount in the memory, and thus, the edge pixels can easily be detected with a simple configuration.

Third Embodiment

Then, a projection system according to a third embodiment of the invention will be explained with reference to the accompanying drawings.

Figure 8:
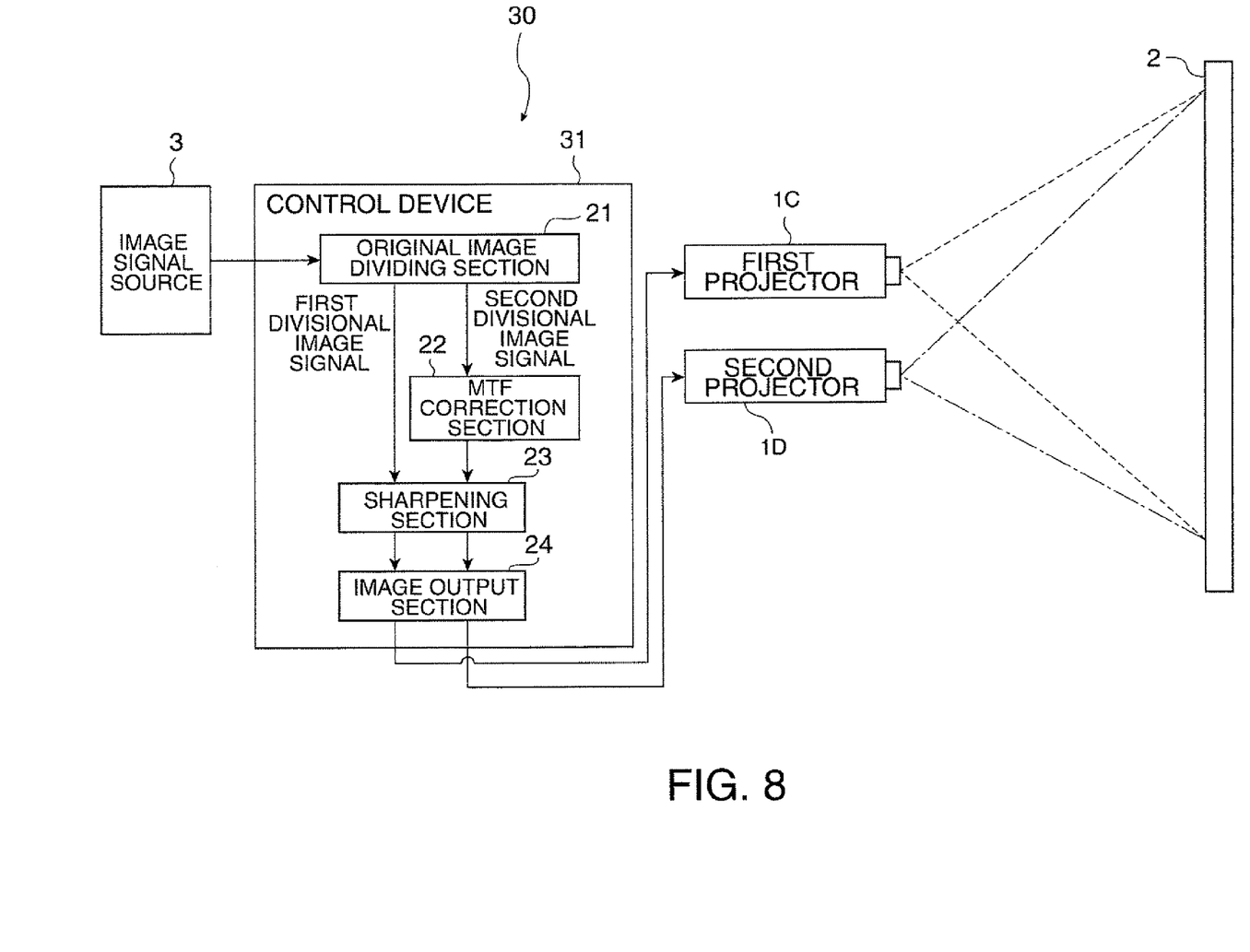
FIG. 8 is a block diagram showing a schematic configuration of a projection system according to a third embodiment of the invention.

FIG. 8 is a block diagram showing a schematic configuration of the projection system according to the third embodiment of the invention.

The projection system 30 according to the third embodiment is a system configured by substituting first and second projectors 1C, 1D for the first and second optical engines 10A, 10B of the first embodiment, respectively, and a control device 31 for the control section 20, and connecting the control device 31 to each of the projectors 1C, 1D.

The pair of projectors 1C, 1D are each provided with a single optical engine, and the engines are provided with configurations substantially identical to those of the optical engines 10A, 10B, respectively, of the first embodiment, namely the illumination optical system, the separation optical system, the light modulation optical system, the light combining optical system, the projection optical system, and the drive circuit.

A multipurpose personal computer, for example, can be used as the control device 31, and controls the operations of the first and second projectors 1C, 1D. Further, although not shown in the drawing, the control device 31 is provided with, for example, a storage circuit for storing the various programs and data, and an arithmetic processing circuit having a central processing unit (CPU) for processing the various programs on the operating system (OS) for controlling the control device 31 and the entire projection system 30. Further, as the programs processed by the CPU of the control device 31, there are included the original image dividing section 21, the MTF correction section 22, the sharpening section 23, the image output section 24, and so on, similarly to those of the first embodiment.

The projection system 30 described above executes the process corresponding to the steps S101 through S105 on the original image signal input from the image signal source 3 to the control device 31 similarly to the projector according to the first embodiment, and outputs the sharpened first and second divisional image signals respectively to the first and second projectors 1C, 1D.

Specifically, when the original image signal is input in the step S101, the control device 31 generates the first and second divisional image signals based on the original image signal in the step S102 using the original image dividing section 21. Subsequently, the MTF correction section 22 executes the MTF correction process for fitting the second divisional image signal into the MTF of the first projector 1C on the second divisional image signal.

Further, the control device 31 makes the sharpening section 23 execute the process of the step S104 to execute the sharpening process on the first divisional image signal generated in the step S102 and the second divisional image signal on which the MTF correction process is executed in the step S103. Specifically, a process substantially identical to the process in the first embodiment can be executed as the sharpening process, and the sharpening section 23 executes the sharpening process expressed as the formula 5 using the Laplacian filter expressed as the formula 4, thereby executing the process of emphasizing the high-frequency component at the edge portion of the image.

Further, in the step S105, the divisional image signals sharpened in the step S104 are output respectively to the first and second projectors 1C, 1D, thereby projecting the image on the screen 2 from the projectors 1C, 1D.

Function and Advantage of Projection System

As described above, similarly to the case of the first embodiment, the projection system 30 according to the third embodiment divides the original image signal input thereto into the first and second divisional image signals corresponding to the oblique pixel slide method using the original image dividing section 21 of the control device 31. Further, the MTF correction section 22 of the control device 31 executes the correction process on the second divisional image signal out of the image signals thus obtained by dividing the original image signal using the MTF correction filter for correcting the second divisional image signal to fit into the MTF of the first projector 1C. Subsequently, the sharpening section 23 executes the sharpening process on the first and second divisional image signals, thus performing the process of emphasizing the edge portion.

Therefore, the function and the advantage substantially the same as those of the first embodiment can be obtained, and even in the case in which the first and second projectors 1C, 1D have the MTF different from each other, it becomes possible to fit the image light beam output from the second projector 1D into the MTF the first projector 1D has. Therefore, even in the case in which the sharpening process is executed on the first divisional image signal and the second divisional image signal on which the MTF correction process has been executed, the difference in luminance between the first and second divisional image signals can be prevented from increasing. Therefore, in the case in which the image is displayed with the pixels slid a half pixel from each other in both of the horizontal and vertical directions in the oblique pixel slide method, it becomes possible to reduce the noise in the edge portion (the contour portion) to form a smooth contour, thereby displaying a high-quality and high-resolution image.

Other Embodiments

It should be noted that the invention is not limited to the embodiments described hereinabove, but can be improved or modified in various forms within the range in which the advantage of the invention can be obtained.

For example, in the third embodiment described above, although the projection system 30 using the control device 31 having the configuration of the control section 20 of the first embodiment is described as an example, it is also possible to configure the projection system having the control device provided with the configuration of the control section 20A of the second embodiment, and the first and second projectors 1C, 1D connected to each other, and in this case, similarly to the case of the second embodiment, by executing the MTF correction process only on the edge pixels, the reduction of the processing load and the speeding up of the processing can be achieved.

Further, although the examples of the projectors 1, 1A using the two optical engines 10A, 10B are described respectively in the first and second embodiments, and the example of the projection system 30 using the two projectors 1C, 1D is described in the third embodiment, the invention is not limited thereto, the projector provided with three or more optical engines and the projection system provided with three or more projectors can also be adopted. In this case, it is also possible for the MTF correction sections 22, 22A to correct the divisional image signals to be output to the respective optical engines (the respective projectors) taking one of the optical engines (one of the projectors) as a reference optical engine (a reference projector), and using the MTF correction filter for correcting the difference in the MTF of other optical engines (other projectors) with respect to the MTF of the reference optical engine (the reference projector), or correct the divisional image signals using the correction filter for correcting the difference in the MTF of all of the optical engines (all of the projectors) with respect to another MTF (e.g., a reference MTF having the gain of 1 in the entire frequency band f).

Further, in the embodiments described above, although there is shown the example in which the original image dividing section 21, the MTF correction sections 22, 22A, the sharpening section 23, the image output section 24, the edge calculation section 25, and the edge determination section 26 are configured as software stored in the memory and retrieved by the CPU to execute the predetermined processes, the invention is not limited thereto. It is also possible that the configuration described above is configured, for example, with various integrated circuits such as an IC chip as hardware so as to be incorporated in a circuit board inside the control section 20 or the control device 31, and also in this case, advantages substantially the same as those of the first through third embodiments can be obtained. Further, in the case in which the sections described above are configured as the software as described above, the software is not only what is stored in the memory, but can also be what is recorded on a computer readable recording medium, such as a hard disk (HD), a compact disc (CD), or a digital versatile disc (DVD). In this case, by making the projector composed of, for example, two or more optical engines and the control section, or the projection system composed of two or more projectors and the control device read the recording medium on which the software described above is recorded, and execute the software in the arithmetic processing section, the projector or the projection system capable of outputting a high-resolution and high-quality image in substantially the same manner as in the embodiments described above can easily be configured.

Although the best configurations for putting the invention into practice are hereinabove explained specifically, the invention is not limited thereto. In other words, although the invention is particularly illustrated and described with respect mainly to specific embodiments, those skilled in the art can apply various modifications and improvements to the embodiments described above within the scope, the spirit, the technical concepts, or the object of the invention.

The entire disclosure of Japanese Patent Application No. 2009-23430, filed Feb. 4, 2009 is expressly incorporated by reference herein.

What is claimed is:

1. A projector comprising:
a first image projection section adapted to project a first image based on a first image signal;
a second image projection section adapted to project a second image based on a second image signal such that pixels of the second image are shifted from pixels of the first image;
a correction section adapted to correct the image signal input to the image projection section using a correction filter adapted to correct a difference in optical transfer function between the plurality of image projection sections; and
a sharpening section adapted to execute a sharpening process of sharpening an edge portion of the image to be displayed, on the image signal having been corrected by the correction section and to be input to the plurality of image projection sections, wherein
the correction section takes the optical transfer function of either one of the plurality of image projection sections as a reference optical transfer function, and corrects the image signal input to the rest of the plurality of image projection sections using the correction filter adapted to correct a difference in optical transfer function of the rest of the plurality of image projection sections with respect to the reference optical transfer function.

2. The projector according to claim 1, further comprising:
an edge detection section adapted to detect an edge area having the edge portion in the image signal, wherein the correction section executes a correction on the edge area detected by the edge detection section, using the correction filter.

3. A projection system comprising:
a first projector adapted to project a first image based on a first image signal;
a second projector adapted to project a second image based on a second image signal such that pixels of the second image are shifted from pixels of the first image;
a correction section adapted to correct the image signal input to the projector using a correction filter adapted to correct a difference in optical transfer function between the plurality of projectors; and
a sharpening section adapted to execute a sharpening process of sharpening an edge portion of the image to be displayed, on the image signal having been corrected by the correction section and to be input to the plurality of image projection sections, wherein
the correction section takes the optical transfer function of either one of the plurality of image projection sections as a reference optical transfer function, and corrects the image signal input to the rest of the plurality of image projection sections using the correction filter adapted to correct a difference in optical transfer function of the rest of the plurality of image projection sections with respect to the reference optical transfer function.

4. An image display method comprising:
(a) providing a first projector adapted to project a first image based on a first image signal and a second projector adapted to project a second image based on a second image signal such that pixels of the second image are shifted from pixels of the first image;
(b) correcting the image signal input to the image projection section using a correction filter adapted to correct a difference in optical transfer function between the plurality of image projection sections; and
(c) executing, after step (b), a sharpening process of sharpening an edge portion of the image to be displayed, on the image signal to be input to the plurality of image projection sections, wherein
the correction section takes the optical transfer function of either one of the plurality of image projection sections as a reference optical transfer function, and corrects the imam signal input to the rest of the plurality of image protection sections using the correction filter adapted to correct a difference in optical transfer function of the rest of the plurality of image projection sections with respect to the reference optical transfer function.

* * * * *